May 19, 1959     W. HOWELL ET AL     2,886,883

TITANIUM ELECTRODE

Filed Jan. 21, 1954

INVENTORS
William Howell and
BY George W. Smith

Frease & Bishop
ATTORNEYS

United States Patent Office 2,886,883
Patented May 19, 1959

2,886,883
TITANIUM ELECTRODE

William Howell, Warren, and George W. Smith, Girard, Ohio, assignors to Mallory-Sharon Titanium Corporation, Niles, Ohio, a corporation of Delaware Application January 21, 1954, Serial No. 405,326

1 Claim. (Cl. 29—184)

This invention relates to a titanium electrode. More specifically it pertains to a consumable electrode composed in whole or in part of titanium scrap material for use in the production of titanium ingots, and to a method of making such a titanium electrode.

During the fabrication of objects from titanium sheets, bars, and plates, a volume of scrap material accumulates. Since titanium is a valuable metal, it is economically desirable to utilize the scrap in the most efficient possible manner. However, titanium sheet scrap is not well adapted to being reclaimed by methods customarily used for scrap of many other metals.

Though most of the scrap pieces could be cut to very small dimensions and consolidated with sponge titanium in stages of producing ingots, this is expensive in that it would subject the metal in the scrap to unnecessary processing. Consequently, it is expedient to use the scrap in ingot-producing operations, with as little processing as possible and without consolidating it with sponge titanium.

It is another object of the present invention to provide a titanium electrode formed wholly or partially of scrap for the production of titanium.

It is another object of this invention to provide a consumable electrode formed wholly or partially from titanium sheet or plate scrap, which electrode is useful in a consumable electrode electric arc furnace for the production of titanium ingots.

Another object of this invention is to provide a method for accomplishing the foregoing objects in a practical and economical manner.

These and other objects and advantages apparent to those skilled in the art from the following description and claims, may be obtained by the parts, constructions, arrangements, combinations, methods, steps, operations and procedures which comprise the present invention, the nature of which is set forth in the following general statement, preferred structural and procedural embodiments of which—illustrative of the best modes in which applicants have contemplated applying the principles—are set forth in the following description, and which are particularly and distinctly pointed out and set forth in the appended claim forming part hereof.

The nature of the improvements in method for making a titanium electrode of the present invention may be stated in general terms as comprising assembling elongated scrap material longitudinally about a rigid core, and circumferentially binding the scrap to the core at spaced intervals to hold the assembly together as a bundle, the scrap, the core and the binding metals having substantially the same or desired analysis. The improvements also include the provision of a titanium electrode for the production of titanium in a consumable electrode electric arc furnace which includes an assembly of a rigid core and a plurality of elongated scrap pieces disposed about the core and secured thereto by a plurality of binding straps circumferentially binding the material to the core at spaced intervals, the core, scrap and binding straps having the desired analysis.

Referring now to the accompanying drawing which is illustrative of preferred embodiments of the invention, and in which like numerals designate similar parts throughout the several views.

Figure 3:
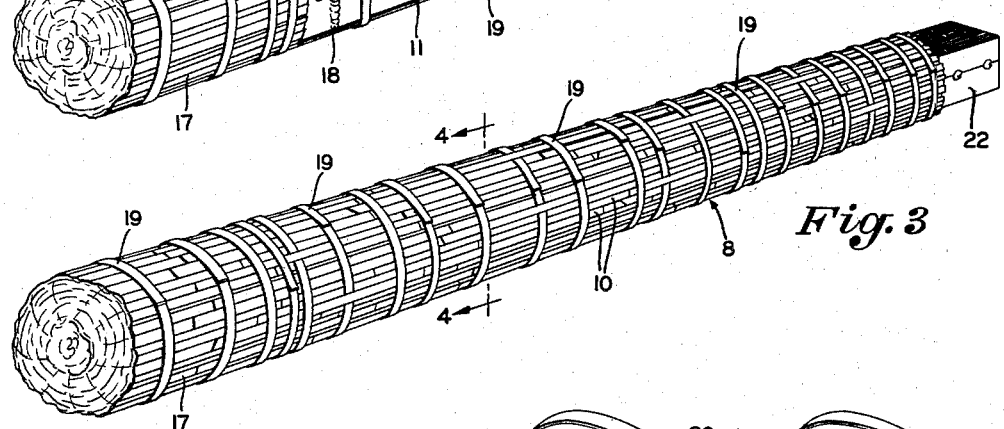
Fig. 3 is a perspective view of a finished titanium electrode in which elongated scrap material is mounted completely around the core and having an exterior surface aligned with that of the stub or butt originally attached to one end of the core.

Referring to Fig. 3, an electrode is generally indicated at 8, having the general appearance of a bundle. It comprises a rigid titanium metal core 9 (Fig. 1) and a plurality of pieces 10 of elongated scrap or shearings from titanium sheets, bars, etc., which are attached to the core 9 in a manner to be described hereinbelow.

Figure 1:
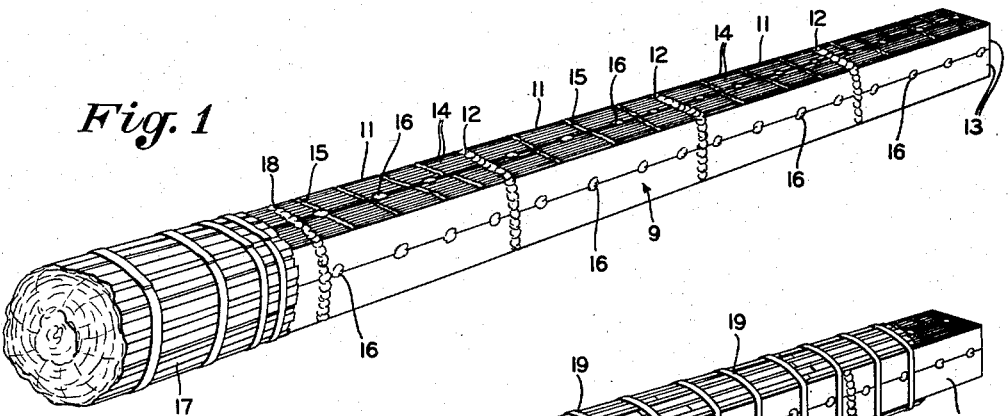
Fig. 1 is a perspective view showing the manner in which several core segments are welded together, and in which the unconsumed stub or butt of another electrode is welded to one end of the assembly.

In Fig. 1 the core is generally indicated at 9. The core may be a single solid member, such as a titanium rod or bar having approximately a one inch cross sectional dimension; or it may be composed, as shown, of a number of portions or longitudinal segments 11 which are joined together, as by welding at 12, constituting the rigid or stiff core 9. Each segment 11 may, in turn, be composed of smaller members 13, having adjacent longitudinal surfaces and which may be laminated bodies that are made of pieces 14 of sheet or plate which are pressed together and welded at their edges, as at 15. In a similar manner, four laminated members 13 are welded together as by spot welds 16. It is the united laminated members 13 which compose the segments 11 which in turn are attached together in end-to-end relationship as by welding to constitute a straight, rigid core 9. However, each core segment 11 may be composed of a solid piece pressed from titanium sponge rather than being a laminated unit.

Where it is desirable, an unconsumed butt or stub 17 of another previously partially consumed electrode may be attached to one end of the core 9 in a satisfactory manner such as by a weld 18. In this manner any remainder of an electrode 8 which is too short for use as such in a melting operation may be satisfactorily consumed by attaching it to the end of a new electrode as just described. Thus, valuable titanium scrap may be readily reclaimed.

Figure 2:
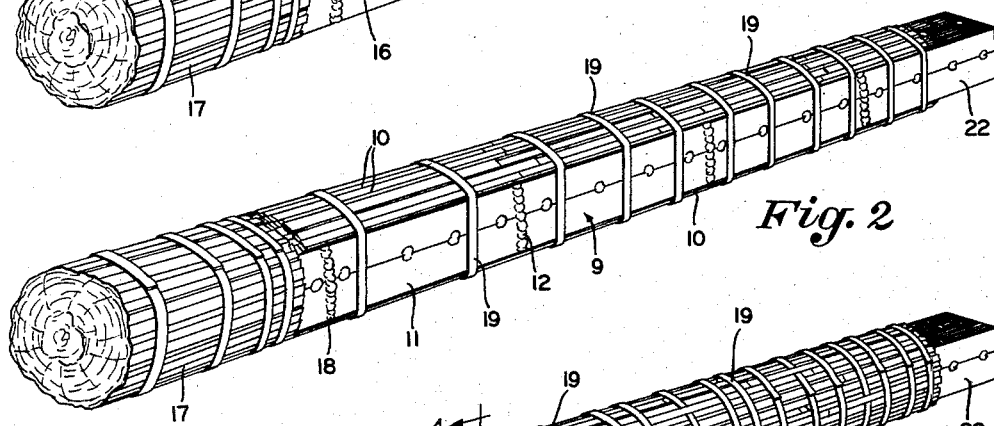
Fig. 2 is a perspective view similar to that of Fig. 1 showing one of the early stages in which scrap material is strapped to the sides of the core.
Figures 4, 5, 6:
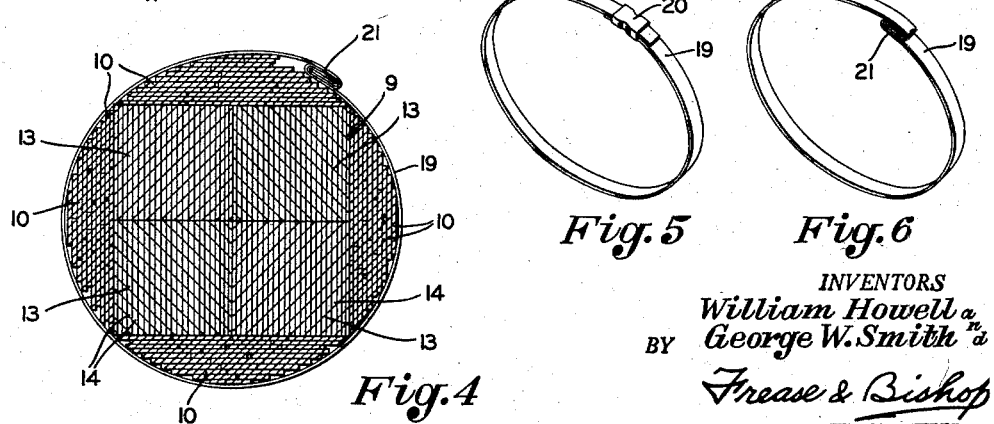
Fig. 4 is a transverse sectional view, taken on the line 4—4 of Fig. 3.
Fig. 5 is a perspective view of a binding strap having a seal attaching the ends thereof.
Fig. 6 is a perspective view of a binding strap having its ends joined in a clinch bend.

In Fig. 2 an intermediate stage of producing the electrode 8 is shown. Here the pieces 10 of elongated scrap or shearings from sheets, bars, etc., are laid upon the surfaces of the core 9 to approximate a portion of a round circumference. Short and long scrap pieces 10 are laid end to end to extend over a greater portion of the core 9 and the pieces may be of irregular thickness and width. Binding straps 19 are then applied for attaching the scrap pieces 10 to the core 9. The straps 19 are preferably titanium strip pieces 10 the ends of which are held together either by a seal 20 (Fig. 5) or by a clinch bend 21 (Fig. 6).

Upon completing the attachment of scrap pieces 10 to certain sides of the core 9, the assembly may be turned and other sides stacked in a similar manner with scrap pieces 10 which are likewise secured by means of straps 19. When all sides of the core are covered in the manner described so as to produce a substantially cylindrical electrode 8, the external surface is aligned substantially with that of the butt or stub 17.

Only an exposed end portion 22 of the core 9 remote from the stub is uncovered. The purpose of the exposed end portion 22 is to provide a means by which the electrode 8 may be secured by conventional clamping means for suspending the electrode in a furnace as a consumable electrode.

An electrode prepared in this manner can be used preferably in the second stage or remelt furnace for the production of 8″ to 10″ or larger titanium ingots. For such purpose the diameter of the electrode 8, after being built up by the scrap pieces 10, should have a dimension slightly less than the inner dimension of the mold. The cross-section of the electrode 8 is substantially uniform throughout its length so that the sides of the electrode will not contact the mold at any point during the melting operation. Such an electrode thus contains a very substantial percentage of scrap material.

Where consecutive melts or ingots are to be produced having the same or substantially similar analysis it is, of course, desirable that scrap of similar analysis be used. Thus, all of the assembled pieces in a given electrode including the core 9, the scrap pieces 10, the butt or stub 17, and the straps 19 and seals 20, should have the same analysis as the desired analysis of the new melt in which the given electrode is to be used. In this manner impurities are not introduced into subsequent melts. Thus, the use of such an electrode with scrap having the desired analysis forms an excellent way to consume and reclaim the valuable scrap with the least expense.

Accordingly, the present invention provides a titanium electrode and method for manufacturing the same from titanium scrap which permits the reclaiming and salvaging of titanium shearings of sheet or plate scrap for the manufacture of more titanium ingots, whereby such scrap is completely utilized.

Moreover, the improved constructions and methods enable the production of a consumable titanium electrode formed of plurality of scrap pieces which, by reason of their assembly, have sufficient electrical conductivity to permit the use of the electrode in a consumable electrode arc furnace for the production of titanium ingots.

In the foregoing description certain terms have been used for brevity, clearness and understanding; but no unnecessary limitations are to be implied therefrom beyond the requirements of the prior art, because such terms are utilized for descriptive purposes herein and not for the purpose of limitation and are intended to be broadly construed.

The description of the improvements or discoveries is by way of example and the scope of the present invention is not limited to the precise details of construction illustrated and described.

Having now described the features, discoveries and principles of the invention, the procedures of preferred methods and steps thereof, the characteristics of the new electrode product obtained thereby, and the advantageous new and useful results provided; the new and useful methods, steps, operations, procedures, discoveries and principles, and mechanical equivalents obvious to those skilled in the art, are set forth in the appended claim.

We claim:

A method of making a consumable titanium electrode from titanium sheet scrap material including the steps of providing a rigid solid titanium core, assembling elongated pieces of titanium sheet scrap material of various shapes and sizes about the core on one side of the core in an irregular manner, each piece of sheet scrap material at least partially overlapping another piece, binding the pieces in place on one side of the core with strip titanium straps at spaced intervals, assembling other pieces of titanium sheet scrap material of various shapes and sizes on another side of the core in an irregular manner, binding the other pieces in place on the other side of the core with strip titanium straps at spaced intervals, and repeating the assembly and binding of more pieces of sheet scrap on the remaining sides of the core.

References Cited in the file of this patent

UNITED STATES PATENTS

| | | |
|---|---|---|
| 162,159 | Durfee | Apr. 20, 1875 |
| 213,855 | Wheeler | Apr. 1, 1879 |
| 255,804 | Murphy | Apr. 4, 1882 |
| 828,982 | Stubblebine | Aug. 21, 1906 |
| 1,674,311 | Wright | July 19, 1928 |
| 2,792,621 | Howell | May 21, 1957 |

UNITED STATES PATENT OFFICE

CERTIFICATE OF CORRECTION

Patent No. 2,886,883 May 19, 1959

William Howell et al.

It is hereby certified that error appears in the above numbered patent requiring correction and that the said Letters Patent should read as corrected below.

In the grant, lines 2 and 3, and line 12, and in the heading to the printed specification, lines 4 and 5, for "Mallory-Sharon Titanium Corporation" read -- Mallory-Sharon Metals Corporation --.

Signed and sealed this 10th day of November 1959.

(SEAL)

Attest:

KARL H. AXLINE

Attesting Officer

ROBERT C. WATSON
Commissioner of Patents